United States Patent
Gacanin

(10) Patent No.: US 9,755,908 B2
(45) Date of Patent: Sep. 5, 2017

(54) HOME NETWORK IDENTIFICATION METHOD AND DEVICE

(71) Applicant: Alcatel-Lucent Bell N.V., Antwerp (BE)

(72) Inventor: Haris Gacanin, Antwerpen (BE)

(73) Assignee: Alcatel Lucent, Boulogne-Billancourt (FR)

( * ) Notice: Subject to any disclaimer, the term of this patent is extended or adjusted under 35 U.S.C. 154(b) by 113 days.

(21) Appl. No.: 14/384,874

(22) PCT Filed: Mar. 25, 2013

(86) PCT No.: PCT/EP2013/056179
§ 371 (c)(1),
(2) Date: Sep. 12, 2014

(87) PCT Pub. No.: WO2013/144044
PCT Pub. Date: Oct. 3, 2013

(65) Prior Publication Data
US 2015/0063162 A1 Mar. 5, 2015

(30) Foreign Application Priority Data

Mar. 27, 2012 (EP) .................................. 12290102

(51) Int. Cl.
*H04L 12/24* (2006.01)
*H04L 12/28* (2006.01)
(Continued)

(52) U.S. Cl.
CPC ............ *H04L 41/12* (2013.01); *H04B 3/542* (2013.01); *H04L 12/2807* (2013.01);
(Continued)

(58) Field of Classification Search
None
See application file for complete search history.

(56) References Cited

U.S. PATENT DOCUMENTS

| | | | |
|---|---|---|---|
| 6,704,288 B1 * | 3/2004 | Dziekan | H04H 20/69 348/E17.001 |
| 7,738,478 B2 * | 6/2010 | Hong | H04L 41/12 370/231 |
| 2004/0203431 A1 * | 10/2004 | Cooper | H04L 41/12 455/67.11 |

FOREIGN PATENT DOCUMENTS

| | | |
|---|---|---|
| CN | 101322366 A | 12/2008 |
| CN | 101552898 A | 10/2009 |

(Continued)

OTHER PUBLICATIONS

Andrea M Tonello et al., "A Top-Down Random Generator for the In-Home PLC Channel", IEEE Communications Society, 2011, pp. 1-5, IEEE Globecom.

(Continued)

*Primary Examiner* — Anh-Vu Ly
*Assistant Examiner* — Hector Reyes Ortiz
(74) *Attorney, Agent, or Firm* — Harness, Dickey & Pierce, P.L.C.

(57) ABSTRACT

A home network topology identification method, wherein the home network (10; 11) has a plurality of network devices (27, 28, 29) with a residential gateway (23) among them, the method comprises the following steps:
  (1a) obtain at least one home network parameter from at least one of the network devices (27, 28, 29);
  (1b) obtain a network channel gain function (CGF) of the home network (10; 11) from one of the network devices (27, 28, 29);
  (1c) transform the channel gain function (CGF) into the time domain to obtain an equivalent estimated channel delay spread function (CDS);
  (1d) obtain an estimated blind network topology from the estimated channel delay spread function (CDS) and a propagation speed of the network; and
  (Continued)

(1e) correlate the estimated blind network topology with the at least one home network parameter to obtain at least one structural network topology parameter; and a management center device (25) that is remote from a home network (10; 11) having a plurality of network devices (27, 28, 29) with a residential gateway (23) among them, wherein the management center device (25) is provided to carry out steps (1a) to (1e) of the method.

9 Claims, 7 Drawing Sheets

(51) Int. Cl.
*H04B 3/54* (2006.01)
*H04L 12/751* (2013.01)

(52) U.S. Cl.
CPC ............... *H04B 2203/5408* (2013.01); *H04B 2203/5416* (2013.01); *H04B 2203/5445* (2013.01); *H04L 45/02* (2013.01); *Y04S 40/164* (2013.01)

(56) References Cited

FOREIGN PATENT DOCUMENTS

| | | |
|---|---|---|
| EP | 2365661 A1 | 9/2011 |
| GB | 2443009 A | 4/2008 |
| JP | 2011172238 A | 9/2011 |
| WO | WO-2008047069 A1 | 4/2008 |

OTHER PUBLICATIONS

Jose Antonio Cortes et al., "On the Statistical Properties of Indoor Power Line Channels: Measurements and Models", IEEE International Symposium on Power Line Communications and Its Applications, 2011, pp. 271-276.

Fabio Versolatto et al "Analysis of the PLC Channel Statistics Using a Bottom-Up Random Simulator", DIEGM, 2010, pp. 236-241, IEEE.

Fabio Versolatto et al., "On the Relation Between Geometrical Distance and Channel Statistics in In-Home PLC Networks", IEEE International Symposium on Power Line Communications and Its Applications, 2012, pp. 1-6.

\* cited by examiner

HOME NETWORK IDENTIFICATION METHOD AND DEVICE

The invention relates to a home network topology identification method and a management center device provided to carry out the method.

BACKGROUND ART

International Telecommunication Union (ITU) standard "G.hn" was defined to enable broadband data communication required by in-house broadband applications. In G.hn, different domains are available for in-house network access by different media, like copper twisted-pairs, coaxial cables, and power line cables.

To date, troubleshooting and diagnostics of in-house networks, also known as home networks, from a remote location outside of the network is a challenging task. In particular, the identification of size and structure of a home network is challenging due to a potential large number of branches and terminations within the home network.

To further illustrate the problem, examples of home networks with relatively simple structures and one branch and three branches, respectively, are shown in FIG. 1. Channel gain functions are depicted in FIG. 2 in an upper part for the one-branch network, and in a lower part of FIG. 2 for the three-branch network of FIG. 1.

More complex examples of home networks are described in FIG. 3. In an upper part, FIG. 3 schematically depicts a home network formed by a power line network or a twisted-pair network comprising twelve nodes and five branches. A lower part of FIG. 1 shows another home network built up of coaxial line technology.

When considering more complex home network topologies, such as in particular Power Line Communication (PLC) networks including a large number of nodes and branches, available solutions of home network topology identification methods are not as efficient as is desirable from a service operator perspective, due to a much more complex channel gain function and the huge number of reflections occurring in all branches of the home network.

DESCRIPTION

Home networks based on media such as power line cables, coaxial cables and twisted-pair cables comprise different segments, for instance branches in power lines and twisted-pair networks, as well as splitters in coaxial networks, that build up a multi-path propagation environment.

In general, a multi-path order characterized by the number of paths in the network is described by a length of a channel impulse response, i.e. a channel delay spread. Naturally, the relationship between the channel delay spread and the network topology is evident. As the number of network segments increases, the multi-path order becomes higher. Consequently, the channel delay spread increases. In particular, the channel delay spread is a function of the home network topology.

This relationship can be exploited to identify a network size and its structure by estimating the network signature through its channel delay spread. Furthermore, the network identification is improved by correlating an estimated network signature and network parameters obtained from the home network devices.

According to an exemplary embodiment of a home network topology identification method, wherein the home network has a plurality of network devices with a residential gateway among them, the method comprises the following steps:

(a) obtain at least one home network parameter from at least one of the network devices;
(b) obtain a network channel gain function of the home network from one of the network devices;
(c) transform the channel gain function into the time domain to obtain an equivalent estimated channel delay spread function;
(d) obtain an estimated blind network topology from the estimated channel delay spread function and a propagation speed of the network; and
(e) correlate the estimated blind network topology with the at least one home network parameter to obtain at least one structural network topology parameter.

A "residential gateway" as used in this application, shall be understood particularly as a home network device that is provided to connect the home network with a wide area network (WAN). The phrase "blind network topology", as used in this application, shall be understood particularly as a set of information on distances between the various network devices of the network, without comprising any structural information on the network. The transformation of the channel gain function into the time domain is preferably carried out by an inverse Fourier transformation. In the case of a discrete measurement, an inverse Fast Fourier transformation (FFT) is preferred.

The at least one home network parameter may be obtained from at least one of the network devices via a network protocol within the network, such as TR-069, or any other protocol that appears to be suitable to the one of skills in the art.

The methods can allow for a reliable and fast identification of the home network topology. By correlating the information that is extracted from the channel delay spread function with the at least one home network parameter, further topology parameters such as connected branches can unambiguously be derived for confirmation of assumptions regarding the network topology, and can be used as a basis of further analysis. Structural properties of the home network, such as branches, can be reliably identified and used for further fitting an estimated network topology to the measured data.

In a suitable embodiment, the method may be carried out in an automatic way and also from a site that is remote from the home network.

In another preferred embodiment, and in case that a phase relationship of the network channel gain function is a priori unknown, step (c) of the method comprises the following steps:

(c1) transform the channel gain function into the time domain;
(c2) shift the channel delay spread function to a selected center time such that an interval of non-zero values of the channel delay spread function is substantially symmetric about the center time;
(c3) apply a window function that is zero-valued outside of an interval of selected length to the channel delay spread function, wherein the interval of selected length is substantially symmetric about the center time;
(c4) shift the windowed channel delay spread function to a time origin;
(c5) convert the windowed channel delay spread function into the frequency domain to obtain a computed channel gain estimate;

(c6) compare the computed channel gain estimate and the channel gain function by applying a metric function for deriving a measure of difference.

Preferably, the metric function that is applied to compare the computed channel gain estimate and the channel gain function is based on a mean-squared error of the computed channel gain estimate, taken as an estimator to the channel gain function as a "true value". Generally, any other metric function that appears to be suitable to the one of skills in the art may be applied as well.

By deriving the measure of difference between the computed channel gain estimate and the channel gain function, an estimate for a correctness of the phase relationship of the network channel gain function can be obtained.

In yet another embodiment, the steps (c3) to (c6) are consecutively carried out with different selected interval lengths to obtain a measure of difference for each of the selected interval lengths, wherein the equivalent estimated channel delay spread function is determined by selecting an interval length of the window function from applying a pre-determined criterion on the measures of difference. Preferably, the pre-determined criterion can be an upper limit for a mean-squared error between the computed channel gain estimate and the channel gain function. Thus, the computed channel gain estimate can be approximated to the channel gain function with a desired accuracy.

In case that the phase relationship of the network channel gain function is a priori known, steps (c1) to (c6) can of course be omitted, and the estimated channel delay spread function which already includes the information on the phase relationship, can be used for further identification.

In another embodiment, the at least one home network parameter that is correlated with the estimated blind network topology is selected from a group of parameters consisting of bit error rate, device identity, time stamp, channel gain, domain identity, and data rate. The correlation of any of these parameters to the estimated blind network topology can improve the reliability of the obtained information on the home network topology and can shorten a processing time required for an identification process.

In a further preferred embodiment, the collected home network parameter is forwarded to a remote management center device that is provided to carry out the method. By that, the costs of a home network can be substantially reduced and the effort of bringing service staff to the site of the home network can be avoided. This embodiment can also allow for a more frequent analysis of the home network, providing an option of preventive maintenance. Preferably, the home network parameter can be collected and forwarded to the remote management center device by the residential gateway.

In another preferred embodiment, the home network substantially is a power line network. The phrase "substantially a power line network", as used in this application, shall be understood particularly as a network that is based on power line cables, and in which at least 70% of all media that are employed for data transmission within the home network are formed as power line cables. As these are commonly available in homes, the method can be applied to a large percentage of existing home networks.

The processing time required for home network topology identification can advantageously be kept short if in step (d) of the method only major reflections of the channel delay spread function are taken into account. Theoretically, there is an infinite number of reflections, so that sorting out irrelevant ones can substantially reduce the processing time. The phrase "major reflections", as used in this application, shall be understood particularly to include those reflections which correspond to an upper 70% of amplitudes, preferably to an upper 60% and, mostly preferred, to an upper 50% of amplitudes that are sorted according to size.

In another aspect, a management center device is provided that is remote from a home network having a plurality of network devices with a residential gateway among them, wherein the management center device is provided to carry out steps (1a) to (1e) of the described method. This can allow for a frequent, automated analysis of the home network at reduced costs and with a high reliability.

These and other aspects of the invention will be apparent from and elucidated with reference to the embodiments described hereinafter.

DETAILED DESCRIPTION

Examples of home networks 10, 10', 11, 11' have already been introduced in the background art section. In the following, the application of an embodiment of the home network topology identification method to the home networks 10 and 10' shown in FIG. 1 will be described.

Figure 1:
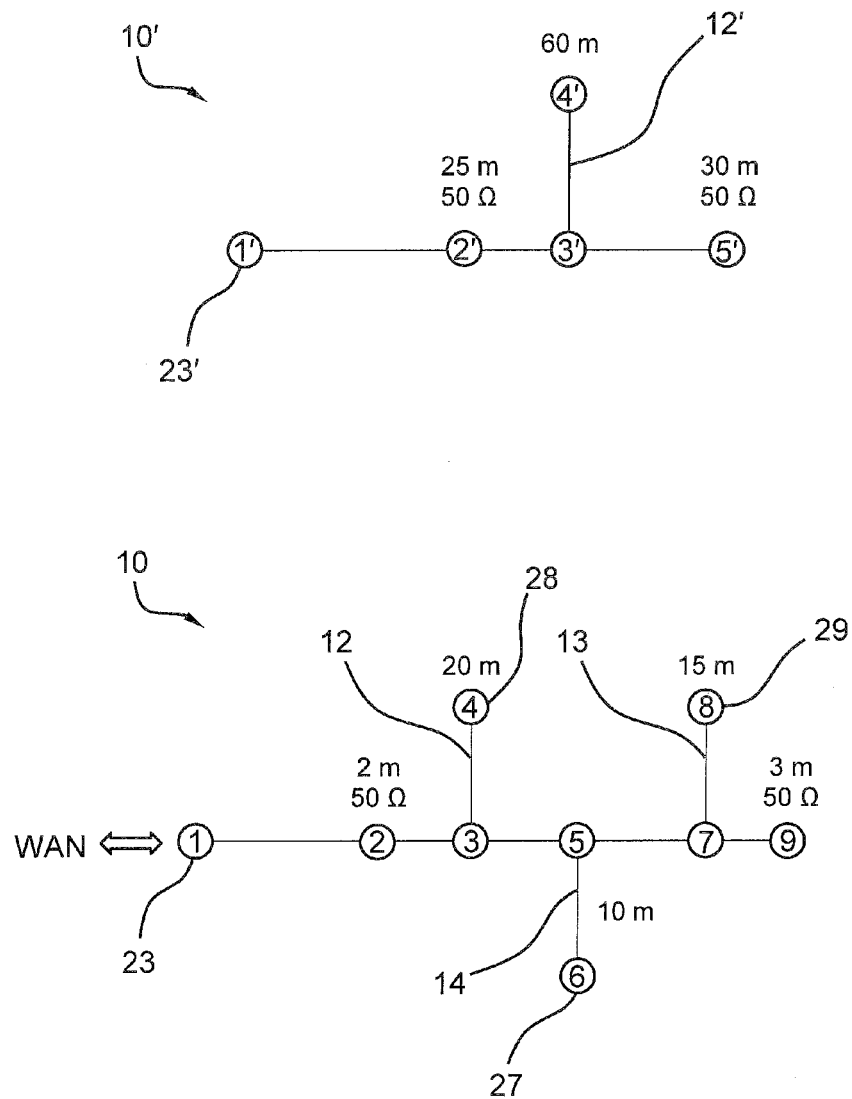
FIG. 1 schematically depicts home network topologies comprising one branch and three branches, respectively.

A lower part of FIG. 1 shows a home network 10 having a plurality of network devices 27, 28, 29 and a residential gateway 23 that is provided to connect the home network 10 with a wide area network WAN such as the Internet. The home network 10 is designed as a power line network with nine nodes 1-9 and three branches 12, 13, 14.

Figure 7:
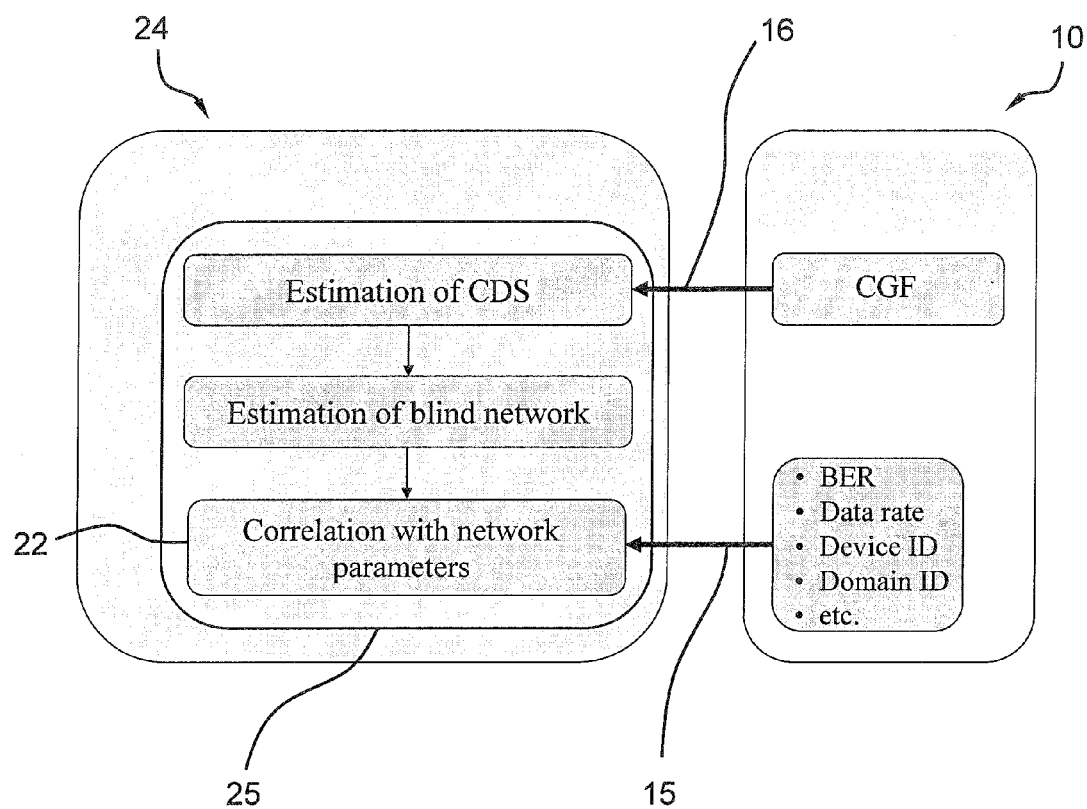
FIG. 7 shows a functional block diagram of an embodiment of the method.

Remote from the home network 10 and connected to it via the residential gateway 23 is a management center 24 with a management center device 25 (FIG. 7). A software module is provided to carry out steps of the home network topology identification method as described in the following. The steps 15-22 (FIGS. 4, 5, and 7) are converted into a program code of the software module that is implementable in and executable by the management center device 25, so that the steps 15-22 of the home network topology identification method are carried out by the remote management center device 25.

In a first step of the home network topology identification method (FIG. 7), home network parameters are collected from the network devices by the residential gateway 23 via management protocol TR (Technical Report)-069 within the home network 10. The collected parameters comprise device identities and transmission time stamps of all connected network devices 27, 28, 29. In general, they can be selected from a group of parameters consisting of bit error rate, device identity, time stamp, channel gain, domain identity, and data rate.

In a second step, a network channel gain function CGF of the home network 10 from one of the network devices 27, 28, 29 is obtained by the residential gateway 23. The collected home network parameters and the network channel gain function CGF are forwarded to the remote management center device 25 via the residential gateway 23 in steps 15 and 16 (FIG. 7).

Figure 5:
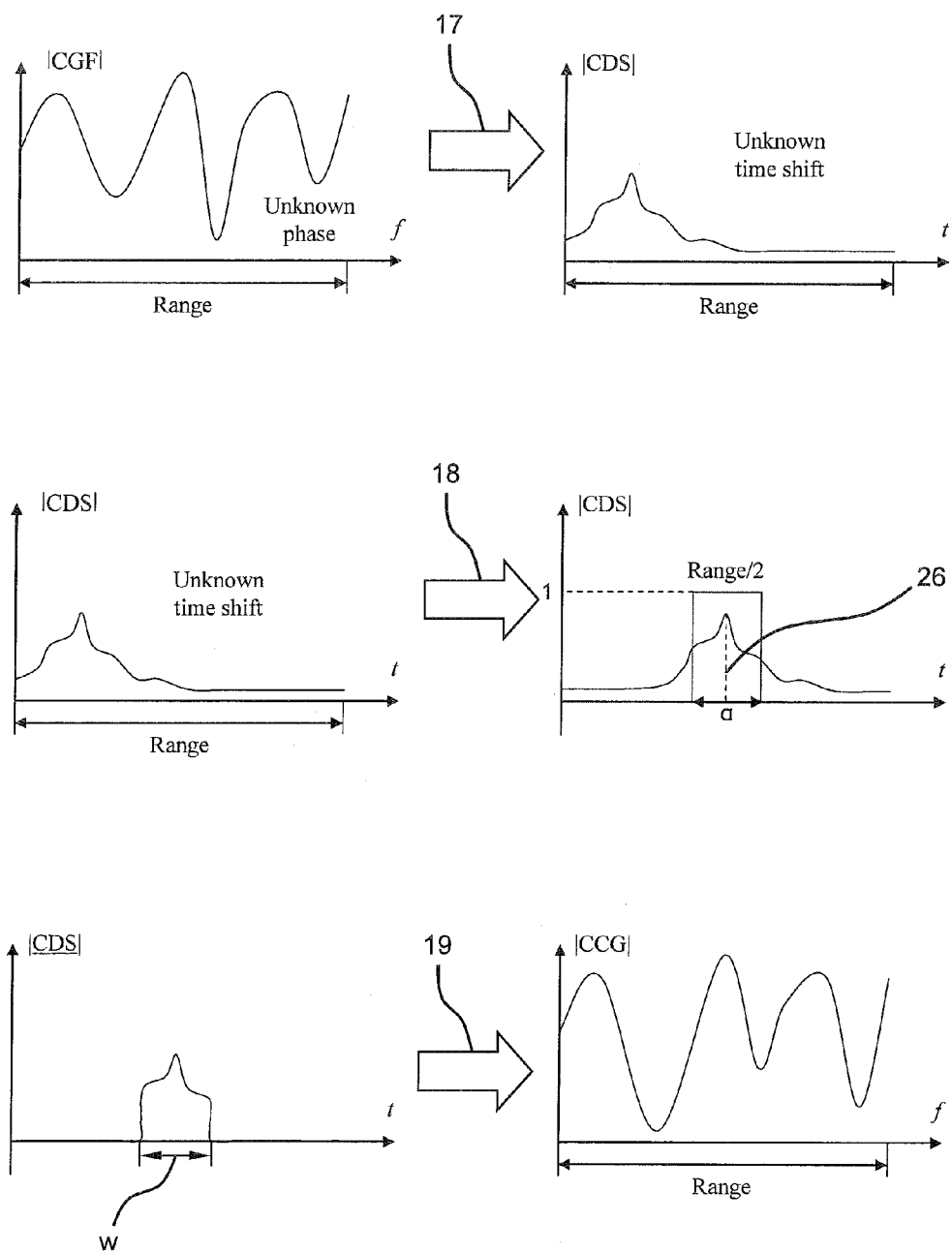
FIG. 5 schematically illustrates results of the steps pursuant to FIG. 4.

In the next step 17, the management center device 25 is provided to transform the channel gain function CGF into the time domain by applying an inverse Fast Fourier Transformation (iFFT) to obtain an equivalent channel delay spread function CDS (FIG. 5, upper part).

Figure 4:
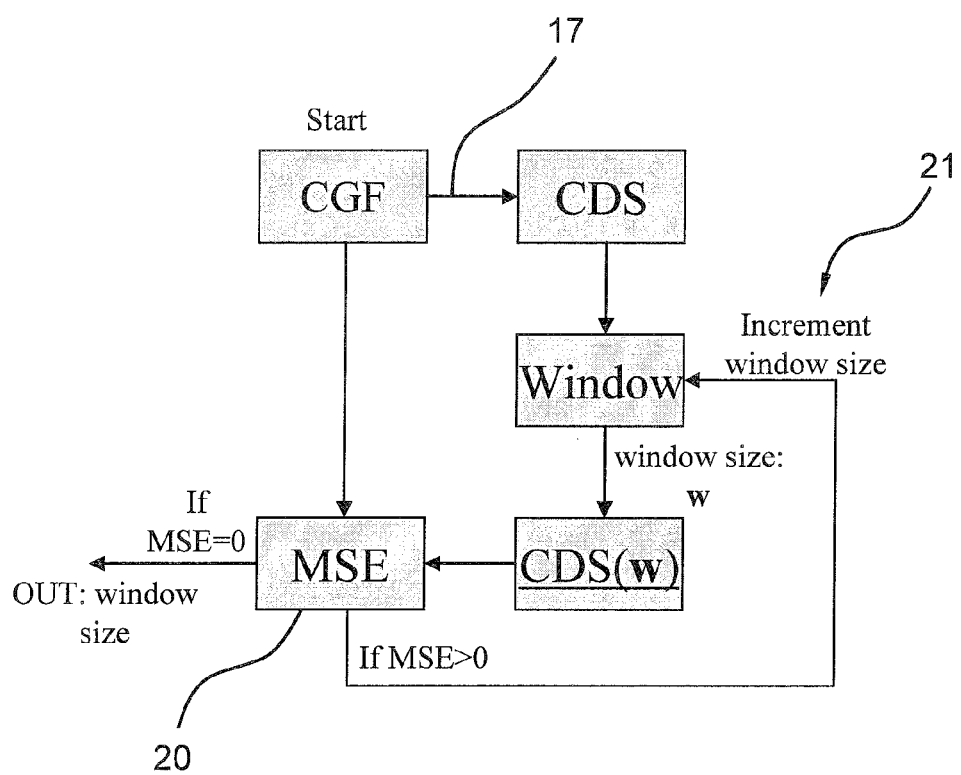
FIG. 4 shows a flow chart of steps of an embodiment of the home network topology identification method.

Due to an a priori unknown phase of the channel gain function CGF, an exact start and end of the channel delay spread function CDS is not known, and must therefore be estimated in another step 18. To this end, the channel delay spread function CDS is shifted to a selected center time 26 such that an interval of non-zero values of the channel delay spread function CDS is substantially symmetric about the center time 26, as shown in FIG. 5, middle part. Then, a window function is applied that is zero-valued outside of an interval of selected length a to the channel delay spread function CDS, wherein the interval of selected length a is substantially symmetric about the center time 26 (FIG. 4 and FIG. 5, middle part). A windowed estimated channel delay spread function CDS resulting from this step 18 is depicted in a lower part of FIG. 5 on the left.

In another step 19 of the method, the windowed estimated channel delay spread function CDS is shifted to a time origin (result not shown in FIG. 5), and the windowed estimated channel delay spread function CDS is converted into the frequency domain to obtain a computed channel gain estimate CCG, as shown in a lower part of FIG. 5 on the right.

Figure 2:
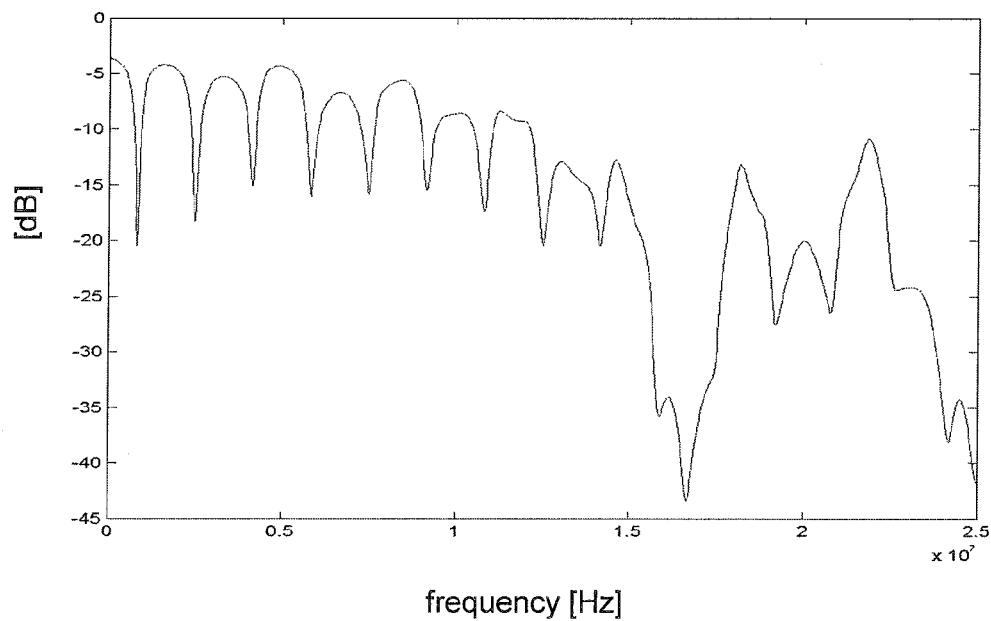
FIG. 2 shows measured channel gain functions of the home networks pursuant to FIG. 1.
Figure 2:
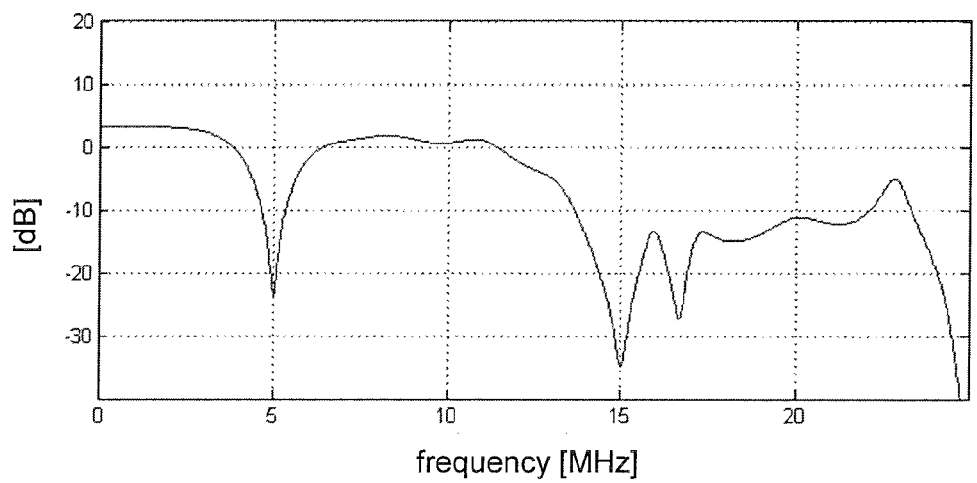
Figure 3:
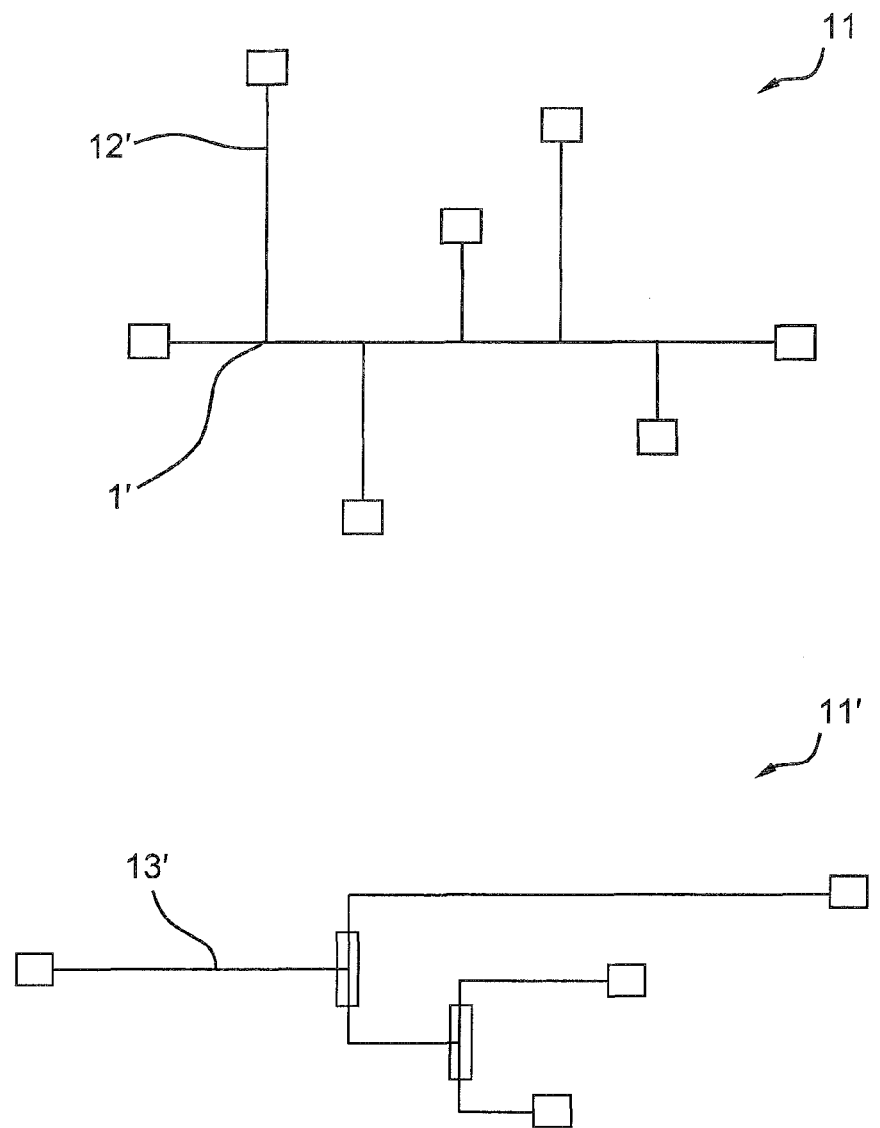
FIG. 3 schematically shows further examples of home networks.

The computed channel gain estimate CCG and the channel gain function CGF are compared by applying a metric function for deriving a measure of difference (FIG. 4). The metric function consists of a mean square error MSE computation taking the computed channel gain estimate CCG as an estimator and the channel gain function CGF as a "true" value, and summing up squared differences between values of the computed channel gain estimate CCG and values of the channel gain function CGF taken at the same frequency, wherein the summation is carried out over a frequency range shown in FIG. 2, lower part, in equidistant frequency steps.

A pre-determined criterion on the measure of difference is stored in a memory unit of the management center device 25 (not shown). In a next step 20, the management center device 25 is provided to apply the pre-determined criterion on the obtained measure of difference between the computed channel gain estimate CCG and the channel gain function CGF.

If the obtained measure of difference fails to fulfill the pre-determined criterion, the management center device 25, in another step 21 (FIG. 4), is provided to increase the selected interval length a of the window function and to reiterate the steps 18-20 of
  applying the window function to the channel delay spread function CDS, wherein the interval of selected length a is substantially symmetric about the center time 26;
  shift the windowed channel delay spread function to the time origin;
  convert the windowed channel delay spread function CDS into the frequency domain to obtain a new estimate of the computed channel gain CCG; and
  compare the new estimate of the computed channel gain CCG and the channel gain function CGF by applying the metric function for deriving a new measure of difference.

These steps 18-20 are consecutively carried out by the management center device 25 with different selected interval lengths a to obtain a measure of difference for each of the selected interval lengths a, as shown in FIG. 4, until one of the obtained measures of difference meets the pre-determined criterion. Then the method stops, and the a priori unknown start and end of the channel delay spread function CDS is determined by selecting the interval length w of the window function for which the criterion on the measures of difference was fulfilled.

Figure 6:
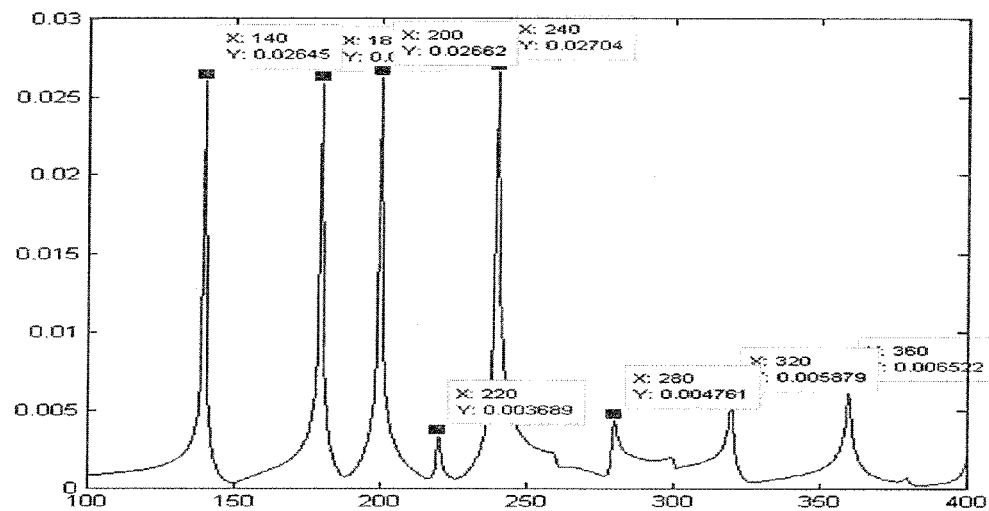
FIG. 6 shows distances of reflections obtained from estimated channel delay spread functions of the home networks pursuant to FIG. 1.
Figure 6:
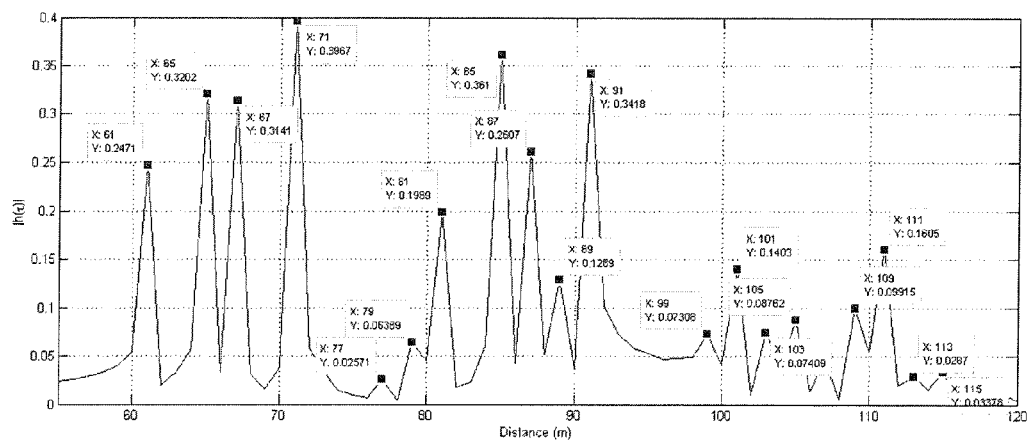

Once the windowed channel delay spread CDS function has been determined, the management center device 25 is provided to obtain an estimated blind network topology from the windowed channel delay spread function CDS and a propagation speed of the network by using the formula distance=propagation speed×estimated delay For an estimation of distances, only major reflections of the channel delay spread function CDS out of the theoretically infinite number of reflections are taken into account, as shown in FIG. 6. The home network size and its segments with corresponding distances are identified as different reflections ("events"), such as peaks and/or attenuations, as shown in FIG. 6 (variable X denotes distance) in an upper part for the one-branch network 10', and in the lower part for the three-branch network 10. Thereby, the blind network topology, i.e. only distances, is estimated.

The blind network topology is taken as a starting point for a final step 22 of the method (FIG. 7), in which the estimated blind network topology is correlated with the collected home network parameters, comprising device identities and transmission time stamps of all connected network devices 27, 28, 29 to obtain at least one structural network topology parameter, such as an identified home network branch 12, 13, 14. For instance, the transmission time stamp and device identities of particular devices may be used to identify a branch 12, 13, 14 with a particular master device and slave network devices. Thus, step 22 of correlation enables a reliable and efficient identification of the home network topology.

It is obvious to the one or skills in the art that the described method is also applicable to sub-networks that exist in one of the branches 12, 13, 14 of the home network 10, 11, so that a complex home network can be identified by correlating an estimated blind network topology with identified sub-network parameters and/or topologies.

While the invention has been illustrated and described in detail in the drawings and foregoing description, such illustration and description are to be considered illustrative or exemplary and not restrictive; the invention is not limited to the disclosed embodiments.

Other variations to be disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting scope.

The invention claimed is:

1. A home network topology identification method, the method comprising:
    obtaining at least one home network parameter from at least two network devices in a home network;
    obtaining a network channel gain function of the home network from one of the at least two network devices;
    transforming the network channel gain function into the time domain to obtain an equivalent estimated channel delay spread function;
    obtaining an estimated blind network topology information such as information on a distance between the at least two network devices in the home network, from the equivalent estimated channel delay spread function and a propagation speed of the home network; and
    correlating the estimated blind network topology information with the at least one home network parameter to obtain at least one structural network topology parameter including an identified home network branch.

2. The method as claimed in claim 1,
    wherein a phase relationship of the network channel gain function is a priori unknown, and
    wherein the transforming further includes,
        shifting the equivalent estimated channel delay spread function to a selected center time such that an interval of non-zero values of the channel delay spread function is substantially symmetric with respect to the selected center time;
        applying a window function that is zero-valued outside of an interval of selected length to the equivalent estimated channel delay spread function to obtain a windowed channel delay spread function, wherein the interval of selected length is substantially symmetric with respect to the selected center time;
        shifting the windowed channel delay spread function to a time origin;
        converting the windowed channel delay spread function into the frequency domain to obtain a computed channel gain estimate;
        comparing the computed channel gain estimate and the network channel gain function by applying a metric function for deriving a measure of difference.

3. The method as claimed in claim 2, wherein the applying, the shifting, the converting and the comparing are consecutively carried out with different selected interval lengths to obtain a measure of difference for each of the selected interval lengths, and wherein the equivalent estimated channel delay spread function is determined by selecting one of the different interval lengths after applying a criterion on the measures of difference.

4. The method as claimed in claim 1, wherein the obtaining the at least one home network parameter obtains the at least one home network parameter from a group of parameters including a bit error rate, a device identity, a time stamp, a channel gain, a domain identity, and a data rate.

5. The method as claimed in claim 1, further comprising:
    forwarding the at least one home network parameter and the network channel gain function to a remote management center, the remote management center carrying out the method of claim 1.

6. The method as claimed in claim 1, wherein the home network substantially is a power line network.

7. The method as claimed in claim 1, wherein the obtaining the estimated blind network topology obtains the estimated blind network topology information by only taking major reflections of the channel delay spread function into account.

8. A management center device that is remote from a home network having a plurality of network devices with a residential gateway among them, the management center device comprising:
    a memory storing executable instructions; and
    at least one processor configured to execute the executable instructions to,
    obtain, via the at least one processor, at least one home network parameter from at least two network devices in a home network;
    obtain, via the at least one processor, a network channel gain function of the home network from one of the at least two network devices;
    transform, via the at least one processor, the network channel gain function into the time domain to obtain an equivalent estimated channel delay spread function;
    obtain, via the at least one processor, an estimated blind network topology information such as information on a distance between the at least two network devices in the home network, from the equivalent estimated channel delay spread function and a propagation speed of the home network; and
    correlate, via the at least one processor, the estimated blind network topology information with the at least one home network parameter to obtain at least one structural network topology parameter including an identified home network branch.

9. The device as claimed in claim 8, wherein the home network substantially is a power line network.

* * * * *